United States Patent Office 3,729,446
Patented Apr. 24, 1973

3,729,446
IMIDO-SUBSTITUTED POLYESTER
COMPOSITIONS
Fred F. Holub and Milton L. Evans, Schenectady, N.Y.,
assignors to General Electric Company
No Drawing. Original application July 1, 1969, Ser. No.
838,314. Divided and this application Apr. 30, 1971,
Ser. No. 139,213
Int. Cl. C08g 17/14
U.S. Cl. 260—47 CZ    3 Claims

ABSTRACT OF THE DISCLOSURE

Polyesters having at least one chemically combined aliphatically unsaturated imido radical, such as a maleimido radical are provided and a method for making such materials. Reaction can be effected between a polyester and an imido-substituted acylhalide, such as a maleimidobenzoylchloride in the presence of an acid acceptor. Blends of the imido-substituted polyester and a variety of aliphatically unsaturated organic monomers, such as styrene, chloro styrene, diallylphthalate, N-phenylmaleimide, bis maleimides or organic polymers such as polystyrenes, styrene-butadiene block copolymers, polyvinylfluoride, polyvinylchloride, polyesters, polysulfone, polysulfone ethers, polycarbonate, polyphenylene oxides, epoxy resins, phenol-formaldehyde resins, acrylonitrile butadiene styrene terpolymers, etc., also are provided. The imido-substituted polyester compositions of the present invention can be employed as coatings, varnishes, injection molding compounds, laminating compounds, etc.

This application is a division of our copending application Ser. No. 838,314, filed July 1, 1969, entitled Imido-Substituted Polyester Compositions.

The present invention relates to polyester compositions comprising polyester having at least one chemically combined aliphatically unsaturated imido radical, such as a maleimido radical, and a method for making such polyester compositions.

The polyester compositions comprise polyester having at least one chemically combined aliphatically unsaturated imido radical of the formula, (1)

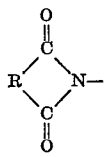

where R is a divalent organo radical selected from hydrocarbon radicals and halogenated hydrocarbon radicals. Included by R of Formula 1 are radicals of the formula,

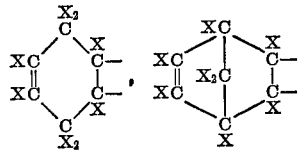

where X is selected from hydrogen, chloro, lower alkyl, such as methyl, ethyl, propyl, butyl and mixtures thereof.

The imido-substituted polyesters of the present invention have at least one chemically combined imido radical of Formula 1, which hereinafter will be referred to as an M radical and which can be joined to the polyester through a Q radical which is a divalent organo connective defined more fully below. The imido-substituted polyesters of the present invention consist essentially of chemically combined self-condensed hydroxycarboxylic acid units of the formula, (2)

and intercondensed units of dihydroxy compounds and dicarboxylic acids of the formula, (3)

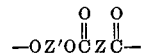

and mixtures thereof, where Z and Z' are selected from M and MQ-substituted divalent organo radicals and a mixture of divalent organo radicals comprising such M and MQ-substituted divalent organo radicals, and divalent organo radicals free of M or MQ-substitution. Z is more particularly selected from, (a) aromatic carbocyclic radicals having from 6 to 18 carbon atoms selected from hydrocarbon radicals and halogenated hydrocarbon radicals, (b) a mixture of divalent organo radicals comprising (a) radicals and divalent saturated aliphatic radicals selected from hydrocarbon radicals and halogenated hydrocarbon radicals, where the (a) radicals are present in such mixture in an amount to provide for at least 5 mole percent, and up to 99.9 mole percent of (a) radicals based on the total moles of divalent organo radicals, and Z' is more particularly selected from (a) radicals defined above, and (c) —AYA— radicals, where A is included by (a) radicals defined above and Y is a divalent connective defined more completely below, (d) a mixture of (a) radicals and (c) radicals, and (e) a mixture of divalent organo radicals comprising (c) radicals, or (d) radicals, and divalent saturated aliphatic radicals selected from hydrocarbon radicals and halogenated hydrocarbon radicals, where the (c) radicals, or (d) radicals are present in such mixture to provide for at least 5 mole percent to 99.9 mole percent of (c) radicals or (d) radicals based on the total moles of divalent organo radicals in the mixture, Q is a divalent connective selected from

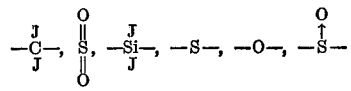

etc.; Y is a divalent connective selected from $$-\underset{J}{\overset{J}{\text{C}}}-,\ \underset{\text{O}}{\overset{\text{O}}{\text{S}}},\ -\underset{J}{\overset{J}{\text{Si}}}-,\ -S-,\ -O-,\ -\overset{\text{O}}{\underset{\text{O}}{\text{S}}}-$$

etc.; where R' is a divalent organo radical free of aliphatic unsaturation included by Z above and selected from hydrocarbon radicals and halogenated hydrocarbon radicals, and J is selected from hydrogen, monovalent hydrocarbon radicals and halogenated monovalent hydrocarbon radicals. Some of the MQ-substituted Z and Z' radicals are shown below in units of Formulas 2 and 3,

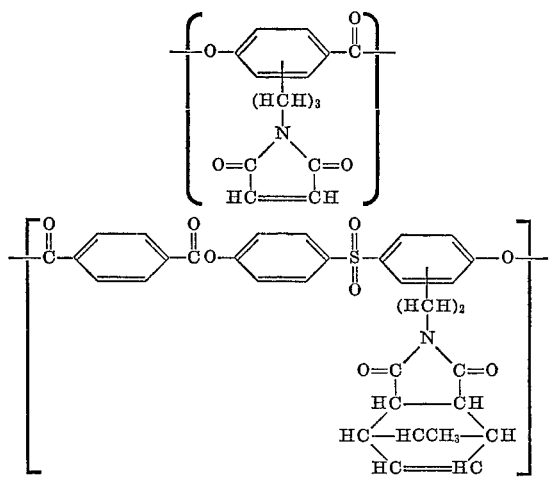

etc. Radicals included by J above, are for example, phenyl, chlorophenyl, naphthyl, etc., alkyl radicals such as methyl, ethyl, propyl, butyl, pentyl, hexyl, etc.

Some of the imido-substituted polyesters included within the scope of the present invention can be made by effecting reaction between a polyester consist essentially of (a) chemically combined self-condsened hydroxy carboxylic acid units of the formula,

(b) intercondensed units of organodihydroxy compounds and organodicarboxylic acid compounds of the formula,

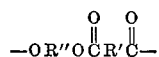

and (c) a mixture of (a) and (b) units,
and an imido compound of the formula.

(6)  MR'G where M and R' are as previously defined, R" is selected from —AYA— radicals and R' radicals as previously defined, and G is an organic radical selected from carboxy, acylhalide, hydroxy and halogen.

Radicals included by R' are, for example, arylene radicals such as phenylene, tolylene, xylene, naphylene, anthylene, etc.; alkylene radicals such as methylene ethylene, trimethylene tetramethylene, pentamethylene, hexamethylene, etc., halogenated divalent hydrocarbon radicals such as chlorophenylene chloronaphthylene, chloroethylene, etc. Radicals included by R" are, for example, the aforementioned R' radicals, and radicals selected from

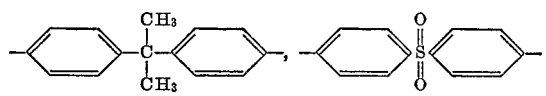

etc.; radicals included by M are, for example,

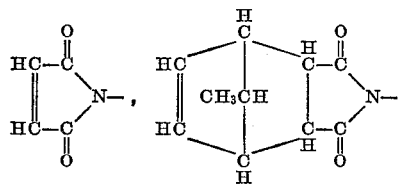

etc.

The imido-substituted polyester compositions of the present invention also can be made by effecting reaction between polyester consisting essentially of chemically combined units of Formulas 4, 5 or mixtures thereof, having at least about 5 mole percent and up to 100 mole percent based on the total moles of chemically combined units in the polyester of aromatic ester units selected from, (7) 

(8) 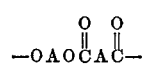

(9) 

and mixtures thereof, where A and Y are as previously defined, and an imido-substituted alkylene compound of the formula,

(10) 

in the presence of a Friedel-Crafts catalyst, such as boron trifluoride, as described in the method of Klebe and Windish Ser. No. 838,322, filed July 1, 1969, now abandoned and assigned to the same assignee as the present invention, where M and J are, as previously defined, D is selected from a halogen and hydroxy radical, and $a$ is an integer equal to 2 to 4 inclusive.

It is to be understood, however, that in instances where polyester is utilized in combination with imido-substituted alkylene compound of Formula 10 that the aromatic ester units may be derived from either aromatic diols combined with aromatic dicarboxylic acids, as shown by Formulas 7, 8 and 9, or that the 10 mole percent of aromatic units or more in the polyester can be derived from combinations of aliphatic diols with aromatic acids, or aromatic diols with aliphatic acids.

Included by the imido compounds of Formula 6, are compounds such as,

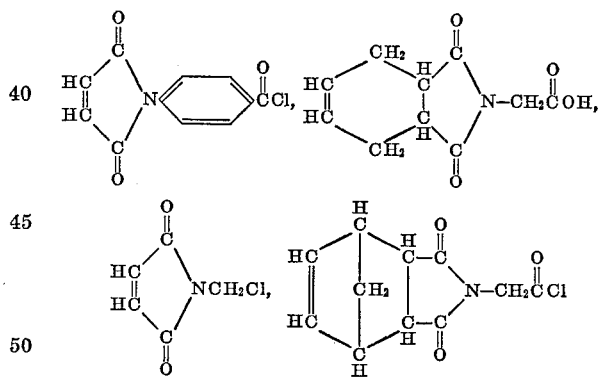

Included by the imido-substituted alkylene compounds of Formula 10 are compounds of the formula,

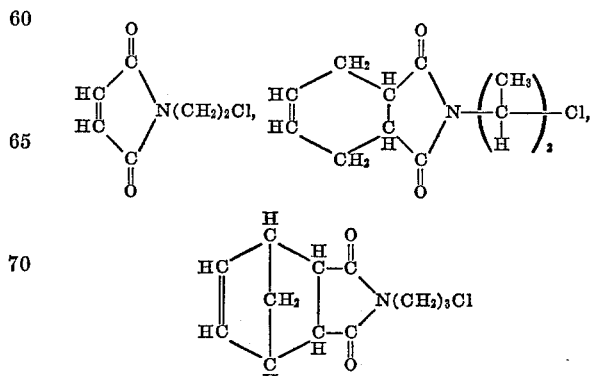

Some of the preferred imido-substituted polyester compositions of the present invention are aromatic polyester compositions having the following formulas,

(11) 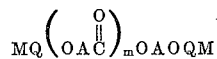

(12) 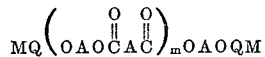

and

(13) 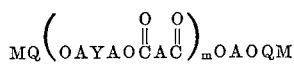

where M, Q, and A are as previously defined and $m$ is an integer equal to 1 to 1,000 inclusive, and preferably 5 to 500.

Included by imido-substituted polyesters of Formula 11 there are the following,

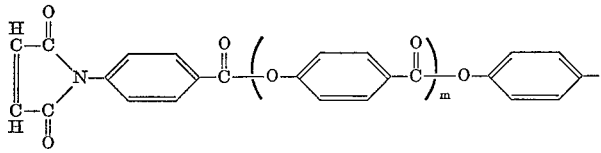

etc. Some of the imido-substituted polyesters included by Formula 12 are polymers such as,

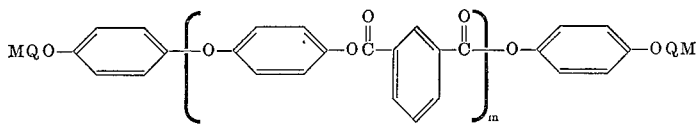

where MQ can be,

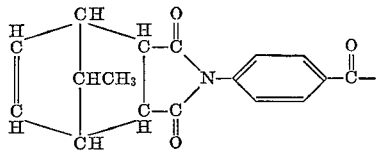

etc. Among the imido-substituted polyesters of Formula 13, there are included,

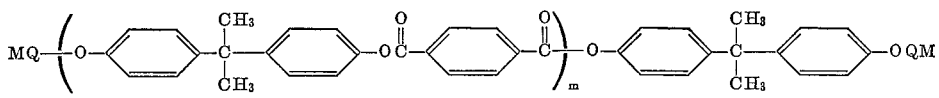

where MQ can be,

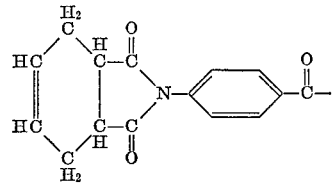

etc.

The polyesters having chemically combined units of Formula 4 or Formula 5 which can be utilized to make the imido-substituted polyesters of the present invention, can be made by various procedures known to the art such as transesterification methods consisting of heating an acetate of hydroxycarboxylic acid, for example acetate of hydroxybenzoic acid, or a mixture of a glycol, diacetate, or a bisphenol diacetate, with a dicarboxylic acid, i.e. ester exchange reactions involving alcoholysis or acidolysis; also methods involving the use of acid chlorides resulting in the production of polyester and hydrogen chloride, etc. may be employed.

Other methods are also included such as polymerization of cyclic esters and lactones, or mixtures thereof, as well as the employment of diols or bisphenols derivatives, with derivatives of dicarboxylic acids, such as acid anhydrides also are included. Additional syntheses of polyesters which can be employed are shown in vol. 16, pp. 159–188. Kirk-Othmer Encyclopedia of Chemical Technology, second edition, Interscience Publishers of John Wiley and Sons, Inc., New York (1968).

Some of the polyester which can be utilized in the practice of the invention consisting essentially of chemically combined units of Formula 5, can be linear or branched. The polyester can be produced by effecting reaction between a polycarboxylic acid and a polyglycol. The polyester can have terminal radicals selected from hydroxy radicals or a mixture of hydroxy and carboxy radicals. Some of the polycarboxylic acids which can be employed in making the polyesters operable in the invention are oxalic acid, succinic acid, glutaric acid, adipic acid, palmitic acid, suberic acid, azelaic acid, sebacic acid, isophthalic acid, terephthalic acid, halogenated isophthalic acid, etc. Glycols which can be employed to make the polyesters utilized in the practice of the invention include 1,4-butanediol, 1,4-cyclohexanecarbinol, ethylene glycol, diethylene glycol, triethylene glycol, etc., propylene glycol, 1,3-butylene glycol, 1,4-butylene glycol, isomers of acetates of dihydroxybenzene, bisphenols, such as diphenyolpropane, halogenated bisphenols, may be employed for aromatic polymers. Mixtures of glycols and triols, such as glycerine, 1,2,6-hexanetriol, trimethylolpropane, pentaerythritol, etc., also can be employed in combination with any one or more of the aforementioned acids. Esterification and transesterification methods for making these polyesters are well known. Organic polymer having terminal hydroxy radicals, or a mixture of hydroxy and carboxy radicals also can be employed consisting of blocks of polyglycol, polyester or mixtures thereof.

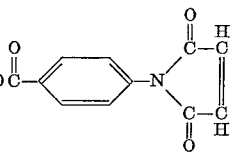

Among the preferred polyesters which can be utilized in the practice of the invention to make the imido-substituted polyesters, are arylpolyesters which can be made by self-condensation of an acetate of hydroxycarboxylic acid as shown by the following equation:

(4) 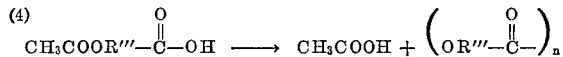

or the interaction of an aromatic diol, or bisphenol, and an aromatic diacidchloride, as shown by the following equation:

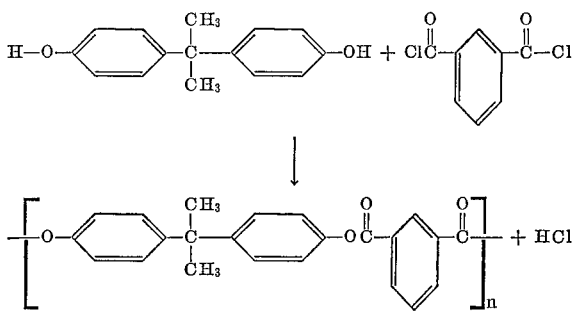

The imido-substituted polyesters of the present invention can be used as molding compounds, varnishes, etc., when utilized with an organic solvent, etc., and such imido-substituted polyester compositions can also be made into solvent resistant coating compositions by heat, exposure to high energy electron irradiation, by curing with peroxides or other free radical initiators. The imido-substituted polyesters of the present invention can be blended with various aliphatically unsaturated organic materials, such as aliphatically unsaturated organic monomers and certain organic polymers as well as organic polymers free of aliphatic saturation. Blends of the imido-substituted polyesters in the aforementioned organic monomers or polymers can be made over wide proportions by weight. Experience has shown that there can be employed in the blend at least about 5 percent by weight of imido-substituted polyester, based on the total blend weight to provide for cured products exhibiting such valuable characteristics as solvent resistance. resistance to deformation at elevated temperatures, etc. Depending upon the proportion of the imido-substituted polyester in the organic polymer or monomer, the blends can provide for laminates, varnishes, molding compounds, coating compositions, etc.

The aliphatically unsaturated organic monomers which can be employed in combination with the imido-substituted polyesters are, for example, N,N',p,p'-diphenylmethane bismaleimide, styrene, N-phenymaleimide, diallylphthalate, N,N'-phenylenebismaleimide, vinylchloride, isobutylene, butadiene, isoprene, chlorotrifluoroethylene, 2-methylpentene-1; vinyl esters of organic carboxylic acid such as vinylformide, vinylacetate, acrylnitrile, etc., esters of acrylic and methacrylic acid, vinylbenzene, triallyltrimetallate, vinylphthalimide, N-allylphthalimide, reaction products of diamines and N,N'-arylenebismaleimide, N-allyltetrachlorophthalimide, etc.

Among the organic polymers that can be employed in combination with the imido-substituted polyesters of the present invention are, for example, polyvinylchloride, polyphenylene oxide, polypropylene, polysulfone, polysulfone ethers, epoxy resins, phenol-formaldehyde resins, polystyrene, polyurethane, organo polysiloxanes, polycarbonates, acrylonitrile-butadiene-styrene copolymers, styrene-butadiene block copolymers, etc.

Cure of the imido-substituted polyesters, or a blend of the imido-substituted polyesters in the aforementioned organic monomers, or polymers can be effected with conventional free radical initiators at temperatures of from 50° C. to 300° C., while 100° C. to 200° C. has sometimes been found to be more desirable. Acceleration of the cure can be achieved with organic peroxide, such as dicumyl peroxide, benzoyl peroxide, tertiary butylperbenzoate, tertiaryalkylperoxycarbonates, etc. The peroxide can be employed for about 0.01 percent to about 5 percent by weight based on the total weight of the imido-substituted polyester blend. In addition, the imido-substituted polyesters or blends thereof, in addition to being curable by the aforementioned radical initiators, can be cured with heat or irradiation with high energy electrons, X-rays, ultraviolet light, etc., depending upon the cross-linked density of the resulting imido-substituted polyester.

One of the methods for making the imido-substituted polyesters of the present invention involves the acylation of the polyester having at least one terminal hydroxy radical and consisting essentially of chemically combined units of either Formula 4 or Formula 5 if an imido-substituted organic compound of Formula 6, such as an imido-substituted organo acylhalide, with an organic solvent, employable at temperatures in the range of between 30° C. to 105° C., and preferably 25–55° C. Any suitable organic solvent can be employed to facilitate the formation of the imido-substituted polyester and preferably organic solvents inert to the reactants under the conditions of reaction. For example, there can be employed such solvents as nitrobenzene, tetrachloroethane, chloro and dichlorobenzene, chloroform, carbon tetrachloride, carbon disulfide, etc. Recovery of the imido-substituted polyesters can be effected by pouring the polyester reaction mixture into a low molecular weight aliphatic alcohol, such as methanol. Filtration of the precipitated product can be followed by standard drying techniques.

Preparation of imido-substituted polyester by the Friedel-Crafts alkylation of polyester containing at least about 10 mole percent of chemically combined units selected from Formulas 7, 8 and 9, or mixtures thereof, can be achieved by using an imido-substituted alkylhalide or hydroxide, as shown by Formula 10 in the presence of a Friedel-Crafts catalyst such as boron trifluoride, boron trichloride, aluminumchloride, etc. The alkylation can be performed at temperatures in the range of between 30° C. to 125° C., and preferably in the range of between 25–65° C. One method, for example, involves agitating a solution of the polyester and the imido-substituted alkylhalide in any suitable organic solvent such as tetrachloroethane, nitrobenzene, orthodichlorobenzene, etc., while slowly introducing the Friedel-Crafts catalyst. Reaction can be performed over a period of from 1 hour to 60 hours, depending upon the conditions employed, the type of imido-substituted alkyl compound utilized, etc. Recoverey of the imido-substituted polyester at the termination of the alkylation also can be effected by pouring the alkylation mixture into a low molecular weight aliphatic alcohol, such as methanol. In addition to the aforementioned aliphatically unsaturated monomers and organic polymers which can be employed with the imido-substituted polyesters, there also can be used in proportions of from 0 to 200 parts, per 100 parts of the imido-substituted polyester, various fillers such as treated clay, ground quartz, glass beads, fused silicas, sand, carbon black, glass fibers, quartz fibers, carbon fibers, asbestos, etc. In addition, other ingredients such as solvents, from 60 percent to 90 percent by weight of the blend, such as N-methylpyrrolidone and dimethylacetamide, methylenedichloride, plasticizers such as dioctylphthalate, trinonyltrimellitate, trioctyltrimellitate, etc. also can be utilized.

In order that those skilled in the art will be better able to practice the present invention, the following examples are given by way of illustration and not by way of limitation. All parts are by weight.

EXAMPLE 1

A mixture of 22.8 parts of 2,2'-bis(4-hydroxyphenyl)-propane, 16.24 parts of isophthaloylchloride and 175 parts of trichlorobiphenyl was stirred and heated under nitrogen for 4 hours at 175° C. There was then added, while the mixture was stirred, 9.41 parts of p-maleimidobenzoylchloride and the mixture heated to 220° C. until hydrogenchloride evolution ceased. The mixture was then cooled and diluted in half with methylene chloride. The solution was poured into methanol in a Waring Blender. A product precipitated from the mixture which was then dissolved in methylene chloride. The product was then reprecipitated in methanol, filtered and dried in vacuo at 90° C. The product had a softening point at 160° C. Based on method of preparation and its infrared spectrum, the product had the approximate average formula,

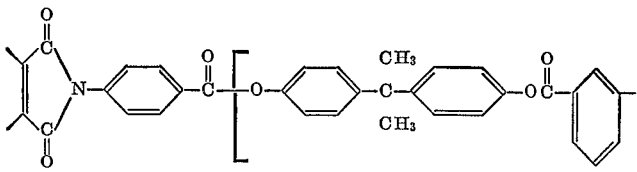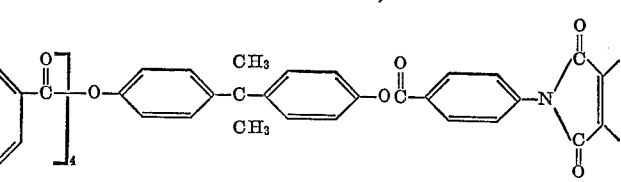

Several parts of the above maleimido-terminated polyester was applied to a glass substrate and heated to 200° C. After 10 minutes, the product changed from a freeflowing liquid to a rubbery solid. The rubber-glass composite was heated to 325° C. before any change in the physical appearance of the polymeric coating was detected. The coating was also found to be insoluble in methylene chloride.

The above procedure was repeated except in place of the p-maleimidobenzoylchloride there was employed benzoylchloride. The resulting maleimido free polyester was found to be still fluid after it has been applied to the glass substrate and maintained at 250° C. for 1 hour. The polyester was found to be soluble in methylene chloride after it was allowed to cool to room temperature.

Based on these results, the above prepared malimido-terminated polyester can be employed as a high temperature solvent resistant insulating coating compound on a variety of substrates.

EXAMPLE 2

A solution of 0.2 part of aluminum chloride in 2 parts of nitrobenzene is added to an anhydrous tetrachloroethylene solution which is mechanically stirred at a temperature of between 80–120° C. under a nitrogen atmosphere, consisting of 1 part of N-(2 - chloroethyl)tetrahydrophthalimide, prepared as shown in Example 14 of application Ser. No. 838,322 previously cited, 5 parts of a polyester prepared from a mixture of bisphenol A and adipoyl chloride (50 mole percent of adipyl units and 50 mole percent of bisphenol A units based on the total moles of the various units in the polyester). After 12 hours, the mixture is poured into methanol contained in a Waring Blender. A polymeric product is recovered in quantitative yield. Based on method of preparation, the product is a polyester having chemically combined units of the formula,

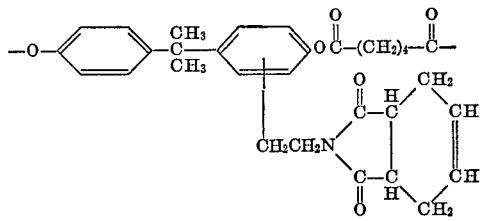

The identity of the product is further confirmed by its infrared spectrum.

A film is cast from a 10 percent solution in tetrachloroethylene of a composition consisting of 98 parts of the above polyester and 2 parts of dicumylperoxide. The film is heated at a temperature of 150° C. for 1 hour and 200° C. for 1 hour. There is obtained a rigid solvent resistant film which can be employed as a wire coating enamel or a dielectric.

EXAMPLE 3

A 20 percent solids by weight of a tetrachloroethane solution of a blend of 50 parts of the maleimido-terminated polyester of Example 1, 50 parts of styrene, and 2 parts of dicumylperoxide was cast on aluminum substrate. The film was cured for 1 hour at 80° C., 1 hour at 125° C. and 1 hour at 200° C. There was obtained a valuable solvent- resistant film which did not melt at temperatures up to 310° C. The styrene-blend could be employed as a high temperature solvent resistant insulating coating compound.

The same procedure was repeated except that in place of the styrene, several other aliphatically unsaturated monomers, including diallyl phthalate and N-phenyl maleimide were employed. These blends also provided for valuable solvent resistant insulating coating compounds.

Blends also were cured following the same procedure except polyester was employed that was free of imido radicals included by Formula 1. The product obtained from these cured blends were found to be soluble in methylene chloride. They also did not possess the high temperature resistance exhibited by the films made from the blends containing the maleimido-terminated polyester.

EXAMPLE 4

A 20 percent by solids by weight tetrachloroethane solution of a blend of 33 parts of the maleimido-terminated polyester of Example 1, 65 parts of polyphenylene oxide and 2 parts dicumylperoxide was cast on an aluminum substrate. The film was cured for 1 hour at 125° C. and 1 hour at 200° C. There was obtained a valuable solvent resistant product which was useful as a high temperature molding compound.

Although the above examples are limited to only a few of the many imido-substituted polyesters included by the present invention, it should be understood that the present invention is directed to a much broader class of imido-substituted polyesters where the N atom of such imido radicals of Formula 1 can be directly joined to the polyester in the terminal position or along the polymer backbone, or be joined to the polymer in either of such positions by a divalent connecting organo radical having 2 or more carbon atoms, including alkylene radicals such as $(CJ_2)_x$ where J is as previously defined and $x$ is an integer having a value of from 2 to 4, inclusive, divalent aromatic carbocyclic radicals having from 6 to 18 carbon atoms, where such alkylene radicals or divalent aromatic carbocyclic radicals can be joined to the polymer by a carbon-carbon bond, or an ester amide carbonate or ether linkage.

What is claimed is:

1. A film forming imido-substituted polyester consisting essentially of divalent ester units of the formula,

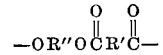

and terminal imido radicals of the formula,

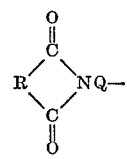

where R is a divalent aliphatically unsaturated hydrocarbon radical, Q is a divalent organo radical selected from the group consisting of

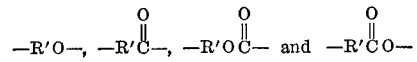

R' is a divalent hydrocarbon free of aliphatic unsaturation, R" is a divalent aromatic organo radical selected from the group consisting of hydrocarbon radicals, —AYA— radicals, mixtures of such aromatic radicals, and mixtures of such aromatic radicals and saturated aliphatic radicals, A is a divalent aromatic radical, Y is a divalent radical selected from the group consisting of

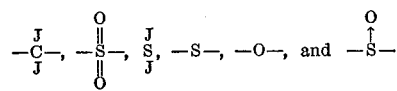

and J is hydrogen or a monovalent hydrocarbon radical.

2. An imido-substituted polyester in accordance with claim 1 of the formula,

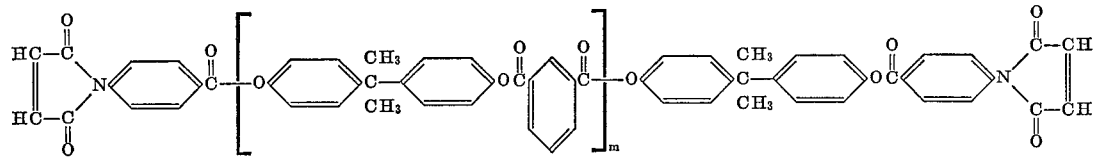

where $m$ has a value of from about 1 to 1,000 inclusive.

3. The solvent resistant product obtained by curing the composition of claim 1 at a temperature of from 50° C. to 300° C.

References Cited

UNITED STATES PATENTS

| | | | |
|---|---|---|---|
| 3,221,080 | 11/1965 | Fox | 260—860 |
| 3,352,832 | 11/1967 | Barr et al. | 260—78 UA |
| 3,373,226 | 3/1968 | Gowan | 260—47 CZ |
| 3,380,964 | 4/1968 | Grundschober et al. | 260—78 UA |
| 3,413,379 | 11/1968 | Schade et al. | 260—47 CZ |
| 3,510,453 | 5/1970 | Geiser | 260—78 UA |

HAROLD D. ANDERSON, Primary Examiner

U.S. Cl. X.R.

117—124 E, 128.4, 132 C; 204—159.19; 260—31.8 XA, 33.8 UA, 41 R, 75 N, 78 UA, 78.3 R, 827, 843, 861, 873